United States Patent [19]

Hluchyj et al.

[11] Patent Number: 5,408,472
[45] Date of Patent: Apr. 18, 1995

[54] DEVICE AND METHOD FOR CELL PROCESSING IN CELL RELAY NODES

[75] Inventors: Michael G. Hluchyj, Wellesley; Steven R. Cook, Franklin, both of Mass.

[73] Assignee: Motorola, Inc., Schaumburg, Ill.

[21] Appl. No.: 123,777

[22] Filed: Sep. 20, 1993

[51] Int. Cl.[6] .............................................. H04J 3/24
[52] U.S. Cl. ..................................... 370/94.1; 370/60
[58] Field of Search ...................... 370/60, 94.1, 95.1, 370/95.3, 109, 84, 85.13, 79

[56] References Cited

U.S. PATENT DOCUMENTS

| | | | |
|---|---|---|---|
| 4,760,570 | 7/1988 | Acampora et al. | 370/60 |
| 5,166,930 | 11/1992 | Braff et al. | 370/60 |
| 5,179,557 | 1/1993 | Kudo | 370/60 |
| 5,231,633 | 7/1993 | Hluchyj et al. | 370/94.1 |
| 5,247,516 | 9/1993 | Bernstein et al. | 370/60 |
| 5,280,475 | 1/1994 | Yanagi et al. | 370/60 |

OTHER PUBLICATIONS

P. Newman, "ATM Technology for Corporate Networks," IEEE Communications Magazine, vol. 30, No. 4, pp. 90-101, Apr. 1992.

Y. S. Yeh, M. G. Hluchyj & A. S. Acampora, "The Knockout Switch: A Simple, Modular Architecture for High-Performance Packet Switching," IEEE Jour. on Selected Areas in Comm., vol. SAC-5, pp. 1274-1283, Oct. 1987.

M. J. Karol, M. G. Hluchyj & S. P. Morgan, "Input vs. Output Queueing on a Space-Division Packet Switch," IEEE Trans. on Communications, vol. COM-35, pp. 1347-1356, Dec. 1987.

Primary Examiner—Douglas W. Olms
Assistant Examiner—Shick Hom
Attorney, Agent, or Firm—Darleen J. Stockley

[57] ABSTRACT

A cell processor and a method for a cell processor (CP) utilize Cell Transit Queues to partition cell processing of cells from a Cell Interconnect in a cell relay network, thereby facilitating cost-efficient cell transmission from a cell interconnect to a node output.

32 Claims, 4 Drawing Sheets

DEVICE AND METHOD FOR CELL PROCESSING IN CELL RELAY NODES

FIELD OF THE INVENTION

This invention relates generally to cell relay networks, and more particularly, to cell processing in cell relay nodes of cell relay networks.

BACKGROUND

Cell relay technology is emerging as the method of choice for future local and wide area communication networks. Such networks carry a wide variety of traffic types from different applications, with data, voice, image and video being the often cited examples. Using a cell relay mechanism to switch different traffic types in a network provides a means for achieving integration of both transmission and switching resources.

FIG. 1, numeral 100, illustrates the elements of a typical cell relay network. Besides the sources of traffic (voice, data, image and video) (102, 104, 106, 108, 110, 112, 114, 116, 118, 120, 122) at its edge, the network consists of nodes (128, 130, 132) for switching traffic, a network manager (124), a Broadband Integrated Services Data Network (B-ISDN, 126) (where selected), and internodal links (INLs) (134, 136, 138, 140) for transporting traffic between nodes (128, 130, 132). In cell relay networks, information is transported in a packet format referred to as a cell. Cell relay networks are connection-oriented, and during connection establishment, a path through the network is determined by a routing function. Following connection establishment, all cells for the connection are relayed along this path. Each node along the selected path serves to relay each arriving cell to the proper output port on the node. The output port on the node may be supporting an internodal link or, at the source or destination edge, supporting an access link to an end system (or to a server in the node that is converting between the native end system format and cells). Cells from several different connections may be multiplexed and carried on the same link.

The relaying of cells in a node makes use of a connection identifier within the cell header. FIG. 2, numeral 200, shows the format of a typical Asynchronous Transfer Mode (ATM) cell (201). The ATM cell header structure at a network node interface includes a first field that is a Virtual Path Identifier field (202), a second field that is subdivided into a VPI field (204) and a Virtual Channel Identifier field (206), a third field that is a VCI field (208), a fourth field that is subdivided into a VCI field (210), a Payload Type (PT) field (212) and a Cell Loss Priority (CLP) field (214), a fifth field that is a Header Error Control (HEC) field (216). The VPI and VCI together form the connection identifier for an ATM cell relay connection. The connection identifier is used to distinguish among cells from different connections multiplexed on the same link: all cells on a link originating from the same connection have the same connection identifier. The identifier has local significance to an ATM internodal or access link. That is, different connection identifiers may be used to identify the same connection on different links along its path. As a cell is relayed by a node from one link to another, the connection identifier is translated from the value used to identify the connection on the inbound link to that which is used to identify the connection on the outbound link. For example, a VPI/VCI of 5/7 used to identify an ATM connection on an inbound link may be translated to values 3/6 to identify the same connection on the outbound link. The cell payload (218) occupies the remainder of the ATM cell (i.e., the information field).

FIG. 3, numeral 300, is a block diagram of the typical basic structure of a cell relay node. It consists of a plurality of Cell Processors (CPs) (304, 306, . . . , 308) interconnected through a Cell Interconnect (302). Each CP supports one or more nodal interfaces, and each nodal interface may support either an access link or an internodal link. One may think of a CP as divided into two halves, one for inbound cell processing and the other for outbound cell processing. The translation of the connection identifier is typically performed by the inbound cell processing. Here the connection identifier of each cell received over an access or internodal link is used to look up a table entry that specifies the outbound link (or switch port supporting that link), along with the new (i.e., translated) connection identifier value associated with the connection on the outbound link. The inbound cell processing may also include traffic monitoring functions (to determine if a connection is violating traffic profiles agreed to during connection establishment) and, depending on the architecture of the Cell Interconnect (302), may include functions for cell queueing for cases when access to the Cell Interconnect (302) is delayed for an inbound cell.

Prior art teaches the architectural design of many different Cell Interconnects. These include an arbitrated bus, a time-division bus, a fully interconnected fabric, and a multistage interconnect. Prior art also teaches that cell queueing is a basic function of any cell switch in that one must be able to handle the case when cells arriving simultaneously on two or more inputs may be destined for the same output on the switch. Prior art also teaches that placing the queueing function at the outputs of the cell switching node avoids problems of head-of-line blocking and provides the best throughput/delay performance achievable. However, placing the queueing function at the outputs of the node (i.e., as part of the outbound cell processing function on the CPs), places a difficult processing load on the outbound side of the CP. Specifically, the instantaneous rate of cell arrivals to a CP, via the Cell Interconnect, for outbound processing may be as high as the aggregate rate of all inbound traffic to the node. Moreover, recent art further teaches the need to enqueue cells into separate queues at the output for connections of different traffic types (constant bit rate, voice and data) that are multiplexed onto a link. The order in which cells are selected for transmission on the link from the individual queues constitutes the service discipline for the queueing system. In addition, the service discipline may need to discard cells (e.g., ATM cells with the Cell Loss Priority (CLP) bit set) during times of congestion (i.e., when one or more of the queues grows significantly). Performing all the required cell processing in the outbound direction at the potentially high rate at which cells may arrive to the CP from the Cell Interconnect is difficult and costly to achieve.

Thus, there is a need for a cost-efficient cell processing device and method that facilitates cell transmission from a cell interconnect to a node output.

BRIEF DESCRIPTIONS OF THE DRAWINGS

Figure 1:
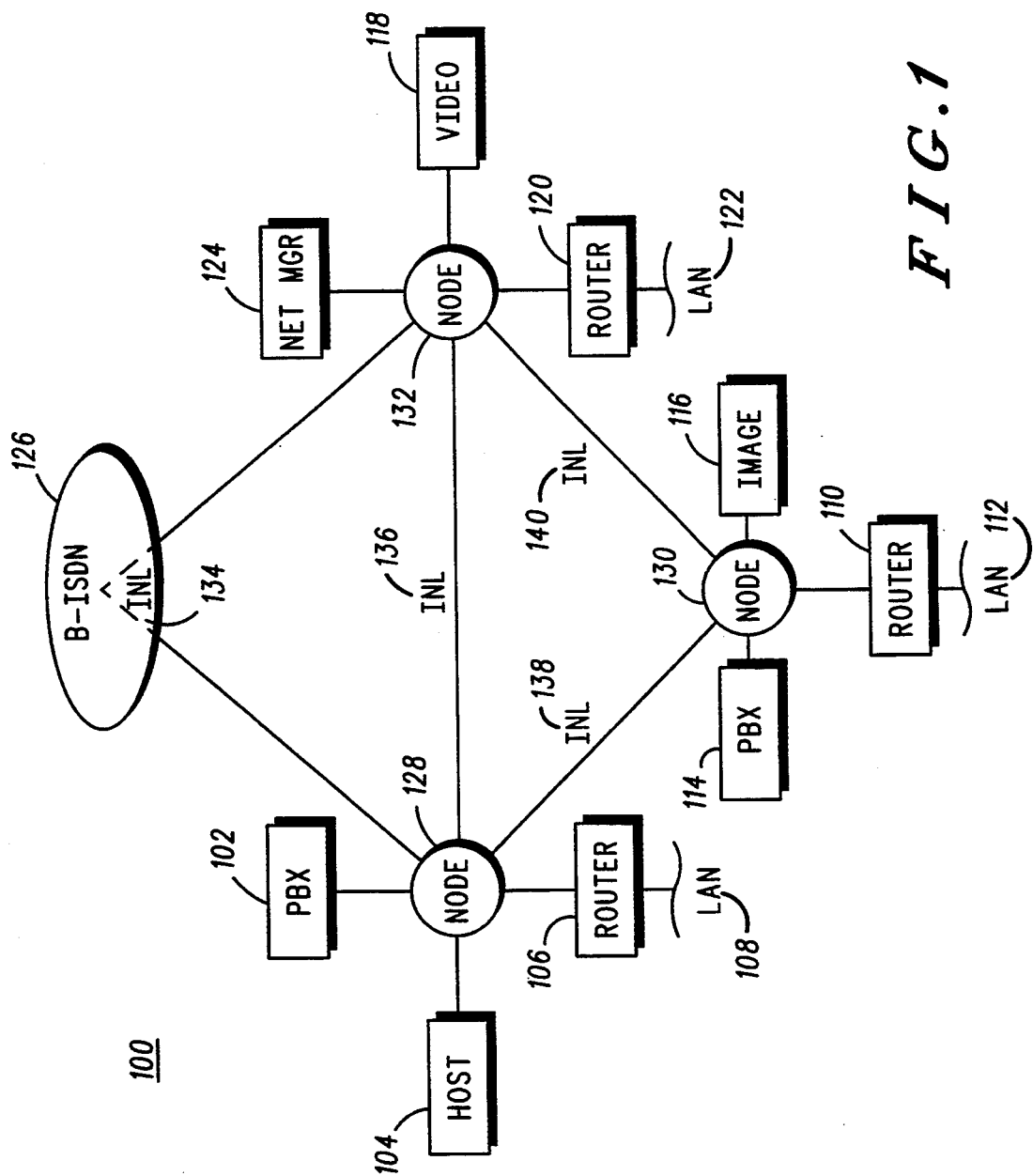
FIG. 1 illustrates the elements of a typical cell relay network.
Figure 2:
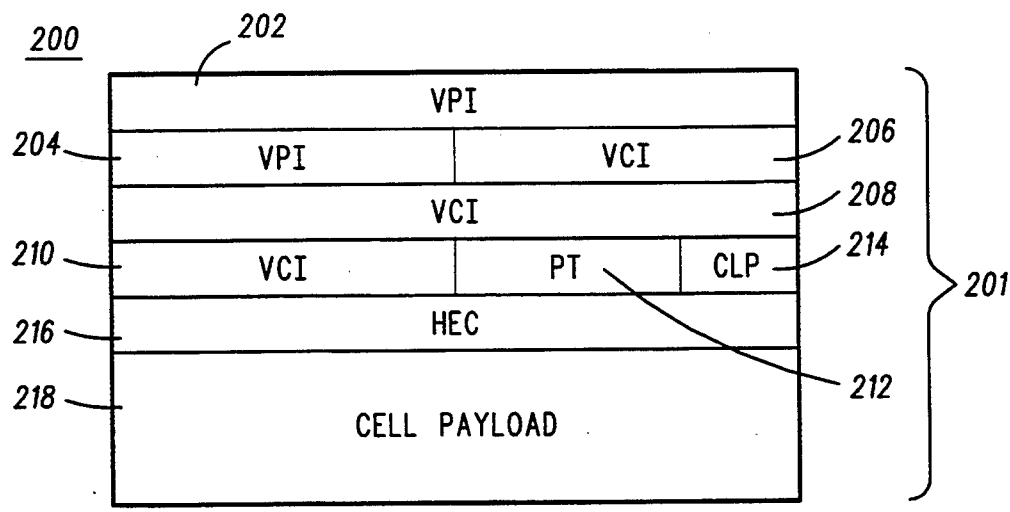
FIG. 2 shows the format of a typical Asynchronous Transfer Mode (ATM) cell.
Figure 3:
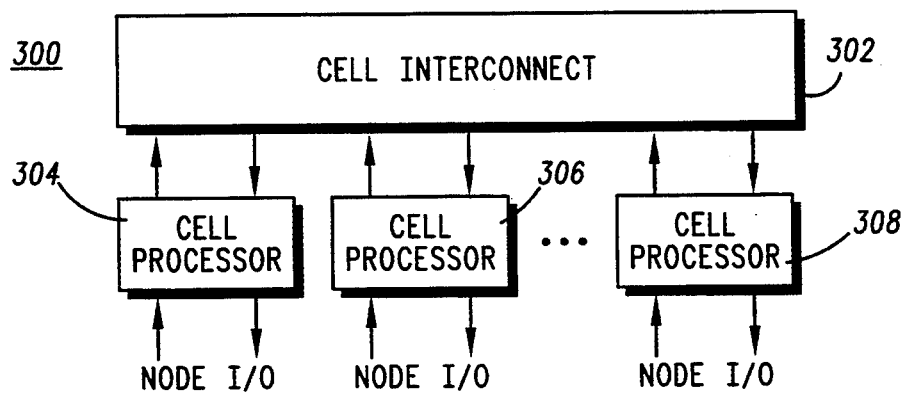
FIG. 3 is a block diagram of the typical basic structure of a cell relay node.
Figure 5:
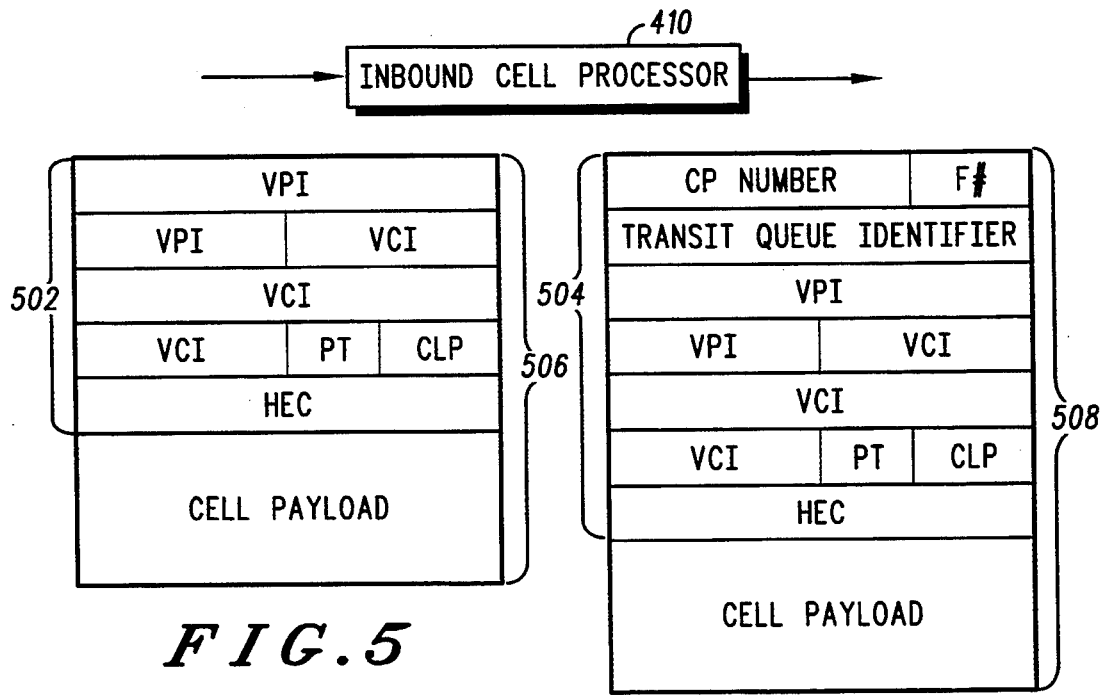

FIG. 5, numeral 500, is a block diagram illustrating the header translation (502—>504) function of the Inbound Cell Processor (410) in accordance with the present invention.

Figure 6:
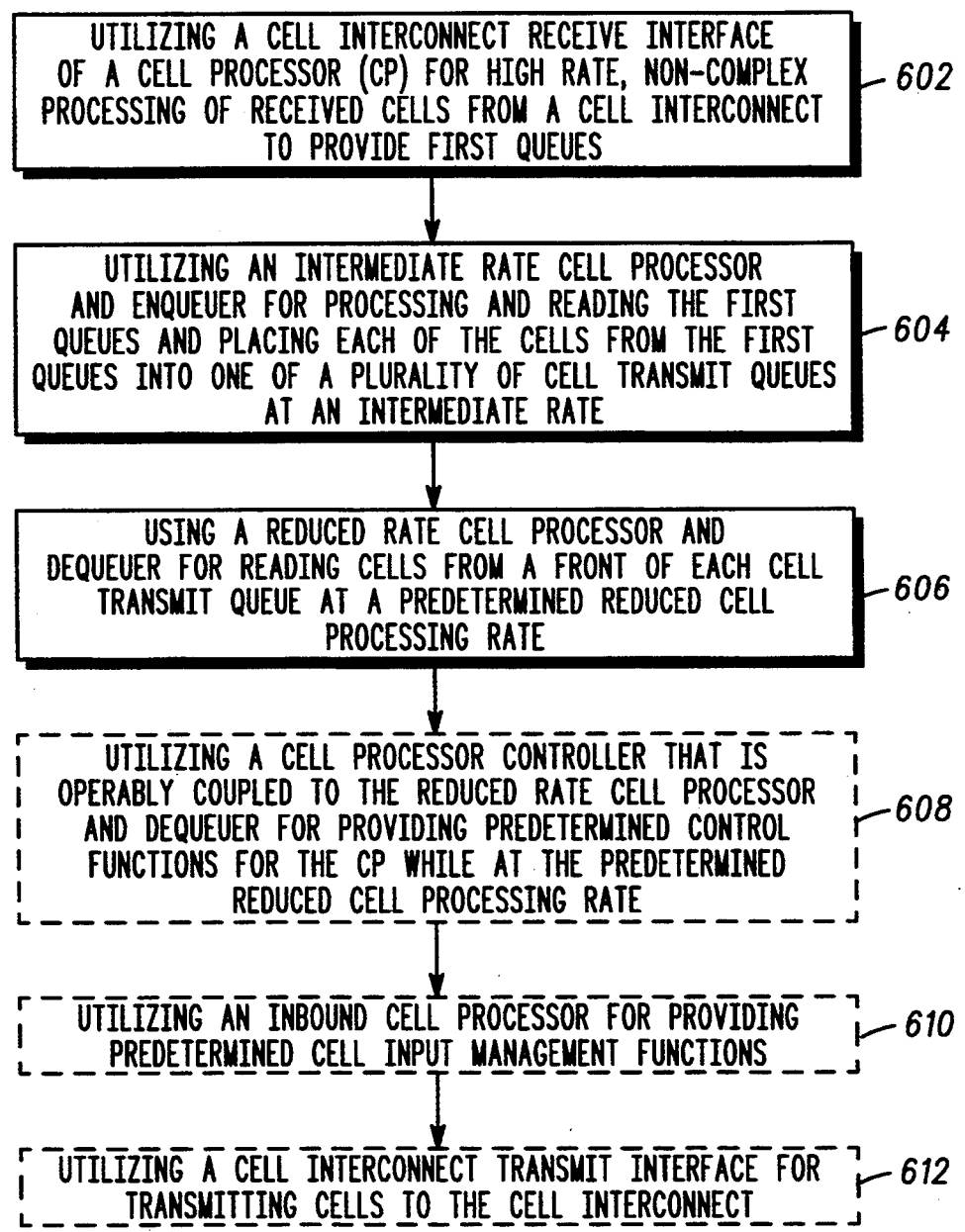

FIG. 6, numeral 600, is a flow chart of steps in accordance with an embodiment of the method of the present invention.

DETAILED DESCRIPTION OF A PREFERRED EMBODIMENT

The device and method of the present invention provide cost-efficient, non-complex cell processing for facilitating cell transmission from a cell interconnect to a node output. The invention partitions the cell processing on the outbound side of the CP into successive stages, with high-rate and simple processing done at the interface to the Cell Interconnect, and reduced rate and more complex processing done as the cells are moved closer to the node output. Thus, the rate of the required cell processing in the outbound direction is controlled such that it is below a potentially high rate utilizing a device/method whose simplicity is cost-efficient.

Figure 4:
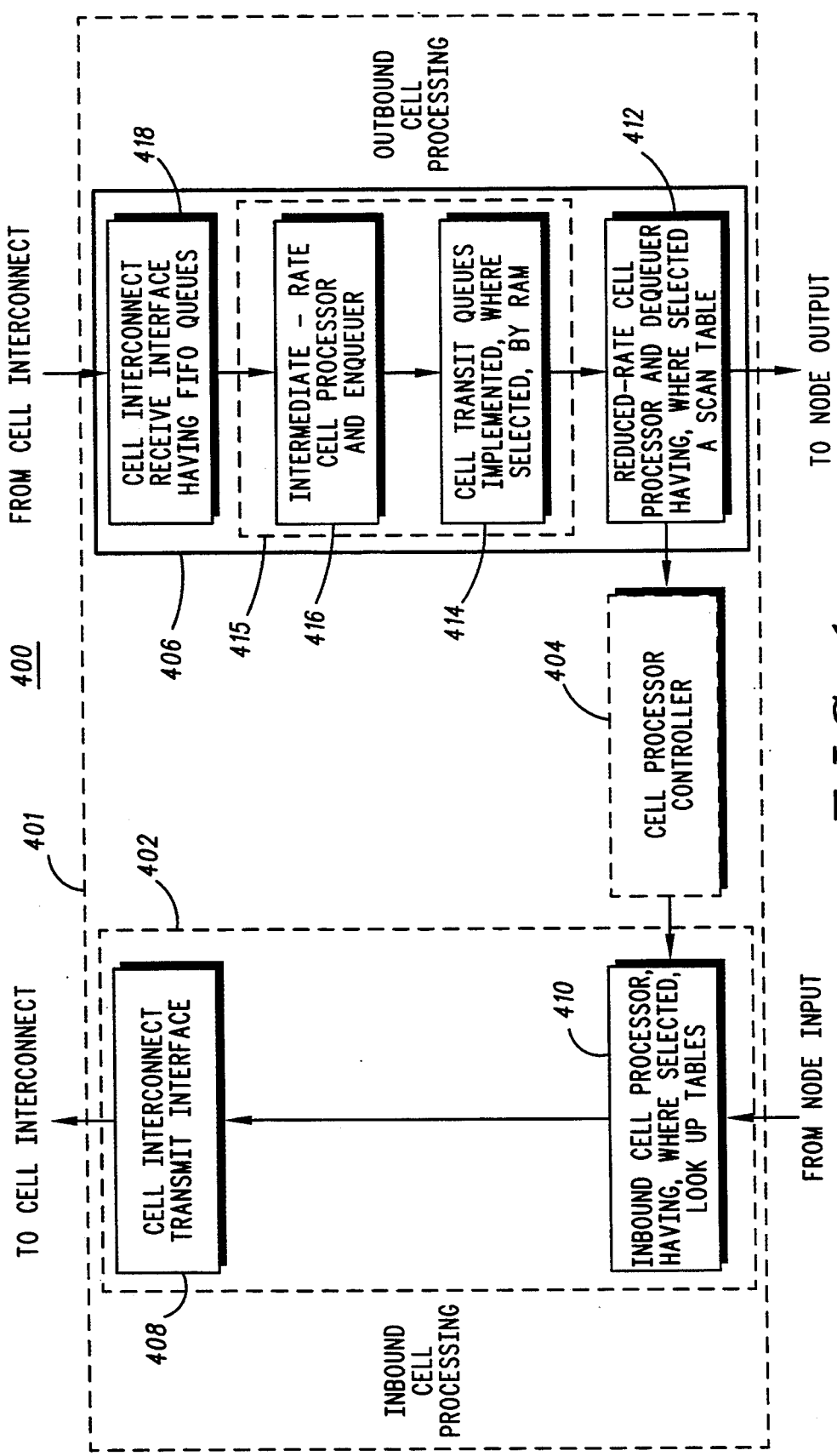
FIG. 4 is a block diagram of an embodiment of elements of a Cell Processor in accordance with the present invention.

FIG. 4, numeral 400, is a block diagram of an embodiment of elements of a Cell Processor (401) in accordance with the present invention. The cell processor (CP) utilizes Cell Transit Queues to partition cell processing of cells from a Cell Interconnect in a cell relay network. The cell processor includes a Cell Interconnect Receive Interface (418), an Intermediate-Rate Cell Processor and Enqueuer (416) with a plurality of Cell Transit Queues (414), and a Reduced-Rate Cell Processor and Dequeuer (412). The Cell Interconnect Receive Interface (418) is operably coupled to receive cells from the Cell Interconnect and is utilized for high rate, non-complex processing of received cells from the Cell Interconnect to provide first queues. The Intermediate-Rate Cell Processor and Enqueuer (416) is operably coupled to the Cell Interconnect Receive Interface (418) and processes and reads the first queues and places each of the cells from the first queues into one of the plurality of Cell Transit Queues (414) at an intermediate rate. The Cell Transit Queues (414) are operably coupled to the Intermediate-Rate Cell Processor and Enqueuer (416) and temporarily store cells received from the Intermediate-Rate Cell Processor and Enqueuer (416). The Reduced-Rate Cell Processor and Dequeuer (412) is operably coupled to the plurality of Cell Transit Queues (414) and reads cells from a front of each Cell Transit Queue at a predetermined reduced cell processing rate.

The CP may be further selected to include a Cell Processor Controller (404) that is operably coupled to the Reduced-Rate Cell Processor and Dequeuer (412) for providing predetermined control functions for the CP while at the predetermined reduced cell processing rate, an Inbound Cell Processor (410) that is operably coupled to the Cell Processor Controller (404) for providing predetermined cell input management functions, and a Cell Interconnect Transmit Interface (408) that is operably coupled to the Inbound Cell Processor (410) for transmitting cells to the Cell Interconnect.

The high rate, non-complex processing of receiving cells from the Cell Interconnect to provide first queues may include at least placing each (unfiltered) cell in one of a predetermined number of first-in-first-out (FIFO) queues in the Cell Interconnect Receive Interface in accordance with a predetermined FIFO number in the cell header. Typically, the predetermined number of FIFO queues is one of: one and two.

Where selected, the Intermediate-Rate Cell Processor and Enqueuer (416) may be further utilized for removing each cell from the FIFO queues and, using a Transit Queue Identifier in the cell header and stripping the Transit Queue Identifier from each cell and placing the cell into one of the plurality of Transit Queues (414). In addition, the Intermediate-Rate Cell Processor and Enqueuer (416) may be selected to discard cells based on the Cell Loss Priority (CLP) bit in the cell header and the state of at least a first transit queue prior to placing the cells in the Transit Queues. Alternatively, the Reduced-Rate Cell Processor and Dequeuer (412) may be selected to maintain the congestion status of the transit queues and perform the function of cell discarding according to a predetermined scheme.

The intermediate rate is typically a rate in a range from an instantaneous rate of cell arrivals from the Cell Interconnect and a maximum aggregate rate at which cells can depart from node output interfaces of one CP and be absorbed by the Cell Processor Controller of the same CP.

The predetermined reduced cell processing rate is a rate nominally equal to the sum of: a maximum aggregate rate at which cells can depart from node output interfaces of one cell processor (CP), and a maximum absorption rate of the Cell Processor Controller.

On the inbound portion (402) of the Cell Processor (401), the Inbound Cell Processor (410) typically performs the functions of cell header translation, traffic monitoring and policing, and statistics collection.

The Cell Transit Queues (414) may be selected to be different sizes, and, where selected, depend on a type of enqueued traffic. Alternatively, the Cell Transit Queues may be selected to be a same predetermined size. In addition, at least a first Transit Queue may be selected to be dedicated to queueing the traffic from a single cell relay connection. Also, cells from more than one connection may be enqueued into a single Transit Queue.

The Reduced-Rate Cell Processor and Dequeuer (412) typically removes cells from the Cell Transit Queues (414) according to a predetermined queueing discipline, and multiplexes these into one of: an internal interface (e.g., Cell Processor Controller), and at least one external interface (e.g., node output). For example, the predetermined queueing discipline may include utilizing a scan table, or, alternatively, performing a computation.

Typically, the Cell Transit Queues (414) are partitions of a random access memory (RAM) unit into a set of cell first-in-first-out (FIFO) queues using a circular buffer arrangement.

The Intermediate-Rate Cell Processor and Enqueuer (416) is typically selected to write cells onto the end of each FIFO at the intermediate rate, and the Reduced-Rate Cell Processor and Dequeuer (412) is typically selected to read cells from the front of each FIFO at a reduced rate.

The predetermined control functions of the CP include controlling predetermined overall functions of the CP, where the predetermined overall functions of the CP include at least one of: writing look up tables associated with the Inbound Cell Processor, collecting traffic statistics, and communicating with Cell Processor Controllers of other CPs in the node by way of the inbound and outbound cell data paths.

FIG. 5, numeral 500, is a block diagram illustrating the header translation (502 − >504) function of the Inbound Cell Processor (410) in accordance with the present invention. Here, based on the VPI/VCI of an inbound cell (506), a table look up is performed to determine (1) the CP Number and Cell Interconnect Receive Interface FIFO Number for the outbound CP, (2) the Transit Queue Identifier for the queue within the outbound CP into which the cell is to be placed, and (3) the new VPI/VCI value associated with the access or internodal link served by the outbound CP. The new VPI/VCI values replace the old ones, and the CP Number, FIFO Number and Transit Queue Identifier are appended to the beginning of the cell to form a new cell format (508). The Cell Interconnect Transmit Interface serves as the interface to the Cell Interconnect. It is used to transmit cells into the Cell Interconnect, and its functionality is tied to the specific architecture of the Cell Interconnect.

FIG. 6, numeral 600, is a flow chart of steps in accordance with an embodiment of the method of the present invention. The method for a cell processor (CP) for utilizing Cell Transit Queues to partition cell processing of cells from a Cell Interconnect in a cell relay network, comprising the steps of: A) utilizing a Cell Interconnect Receive Interface for high rate, non-complex processing of receiving cells from a Cell Interconnect to provide first queues (602), B) utilizing an Intermediate-Rate Cell Processor and Enqueuer for processing and reading the first queues and placing each of the cells from the first queues into one of a plurality of Cell Transit Queues at an intermediate rate (604), and C) using a Reduced-Rate Cell Processor and Dequeuer for reading cells from a front of each Cell Transit Queue at a predetermined reduced cell processing rate (606).

The method may be further selected to include the steps of D) utilizing a Cell Processor Controller that is operably coupled to the Reduced-Rate Cell Processor and Dequeuer for providing predetermined control functions for the CP while at the predetermined reduced cell processing rate (608), E) utilizing an Inbound Cell Processor for providing predetermined cell input management functions (610), and F) utilizing a Cell Interconnect Transmit Interface for transmitting cells to the Cell Interconnect (612).

Typically, the high rate, non-complex processing of receiving cells from the Cell Interconnect to provide first queues includes at least placing each (unfiltered) cell in one of a predetermined number of first-in-first-out (FIFO) queues in the Cell Interconnect Receive Interface in accordance with a predetermined FIFO number in the cell header. The predetermined number of FIFO queues is typically one of: one and two.

The step of utilizing an Intermediate-Rate Cell Processor and Enqueuer for processing and reading the first queues and placing cells from the first queues into a plurality of transit queues at an intermediate rate typically includes removing each cell from the FIFO queues and, using a Transit Queue Identifier in the cell header and stripping the Transit Queue Identifier from each cell and placing the cell into one of the plurality of Transit Queues.

The method may further include the step of the Intermediate-Rate Cell Processor and Enqueuer discarding cells based on the Cell Loss Priority (CLP) bit in the cell header and the state of at least a first transit queue prior to placing the cells in the Transit Queues. The method of may also further include the step of the Reduced-Rate Cell Processor and Dequeuer maintaining the congestion status of the transit queues and performing the function of cell discarding according to a predetermined scheme.

The intermediate rate is a rate in a range from an instantaneous rate of cell arrivals from the Cell Interconnect and a maximum aggregate rate at which cells can depart from CP node output interfaces and be absorbed by the Cell Processor Controller. The predetermined reduced cell processing rate is a rate nominally equal to the sum of: a maximum aggregate rate at which cells can depart from node output interfaces of one cell processor (CP), and a maximum absorption rate of the Cell Processor Controller.

The step of utilizing an Inbound Cell Processor for providing predetermined cell input management functions typically includes performing at least one of: translation, traffic monitoring and policing, and statistics collection.

The Transit Queues may be selected to be of different sizes, and, where selected, depend on a type of enqueued traffic, or, alternatively, the Transit Queues may be select to be of a same predetermined size. Where selected, at least a first Transit Queue may be dedicated to queueing the traffic from a single cell relay connection. Also, cells from more than one connection may be enqueued into a single Transit Queue.

The Reduced-Rate Cell Processor and Dequeuer may remove cells from the Cell Transit Queues according to a predetermined queueing discipline, and multiplexes these into one of: an internal interface (i.e., Cell Processor Controller), and at least one external interface (i.e., node output). The predetermined queueing discipline may be selected to include one of: utilizing a scan table, and performing a computation.

Cell Transit Queues are typically implemented by means of a random access memory (RAM) unit that is partitioned into a set of cell first-in-first-out (FIFO) queues using a circular buffer arrangement.

The step of utilizing an Intermediate-Rate Cell Processor and Enqueuer for processing and reading the first queues and placing each of the cells from the first queues into one of a plurality of Cell Transit Queues at an intermediate rate generally includes the Intermediate-Rate Cell Processor and Enqueuer writing cells onto the end of each FIFO at the intermediate rate, and the Reduced-Rate Cell Processor and Dequeuer reading cells from the front of each FIFO at a reduced rate.

The predetermined control functions of the CP typically include controlling predetermined overall functions of the CP, wherein the predetermined overall functions of the CP include at least one of: writing look up tables associated with the Inbound Cell Processor, collecting traffic statistics, and communicating with Cell Processor Controllers of other CPs in the node by way of the inbound and outbound cell data paths.

On the outbound side of the CP, the Cell Interconnect Receive Interface uses the CP Number in the cell header to filter out (i.e., ignore or discard) all cells arriving at the Cell Interconnect Receive Interface that are not destined to that CP. Based on a FIFO (first in, first out) number (F#) in the cell header, the Cell Interconnect Receive Interface (418) places each unfiltered cell in one of a small number of FIFO queues (typically one or two) in the Cell Interconnect Receive Interface; stripping the CP Number and FIFO Number fields in the cell prior to placing the cell in the FIFO. The FIFOs may be used to offer priority service to cells from highly delay sensitive connections, but in many cases, a single FIFO queue in the Cell Interconnect Receive Interface is sufficient. To avoid cell loss, the rate at which cells are written into the Cell Interconnect Receive Interface FIFOs is comparable to the instantaneous rate of cell arrivals from the Cell Interconnect.

The Cell Interconnect Receive Interface FIFO queues are accessed and read by the Intermediate-Rate Cell Processor and Enqueuer. Operating at an intermediate Rate (between the instantaneous rate of cell arrivals from the Cell Interconnect, and the maximum aggregate rate at which cells can depart from the CP node output interfaces and be absorbed by the Cell Processor Controller), the Intermediate-Rate Cell Processor and Enqueuer removes each cell from the Cell Interconnect Receive Interface FIFO queues and, using the Transit Queue Identifier in the cell header, places the cell into one of a potentially large number (100's or 1000s') of Transit Queues (stripping the Transit Queue Identifier prior to placing the cell in the queue). In one embodiment of the invention, the Intermediate-Rate Cell Processor and Enqueuer is enabled to discard cells based on the Cell Loss Priority (CLP) bit in the cell header and the state of more or more of the transit queues. This discarding is done prior to placing the cells in the Transit Queues. In another embodiment, this cell discard function is done by the Reduced-Rate Cell Processor and Dequeuer (see below).

In the preferred embodiment, the Cell Transit Queues are implemented by means of a RAM that is partitioned into a set of cell FIFO queues using a circular buffer arrangement. The Intermediate-Rate Cell Processor and Enqueuer writes cells onto the end of each FIFO at the intermediate rate, and the Reduced-Rate Cell Processor and Dequeuer reads cells from the front of each FIFO at a reduced rate. The separate Transit Queues may be of different sizes, depending on the type of traffic that they are enqueueing. In some cases, a Transit Queue may be dedicated to queueing the traffic from a single cell relay connection. In other cases, the cells from more than one connection are enqueued into a single Transit Queue.

The Reduced-Rate Cell Processor and Dequeuer operates at a reduced cell processing rate that is compatible with the maximum aggregate rate at which cells can depart from the CP node output interfaces and be absorbed by the Cell Processor Controller. It removes cells from the Cell Transit Queues, according to a defined queueing discipline, and multiplexes these into an internal interface (i.e., Cell Processor Controller) or one or more external interfaces (i.e., node outputs). The decision process for determining from which transit queue to remove the next cell may involve examining a scan table or performing a computation. In addition, the Reduced-Rate Cell Processor and Dequeuer may need to perform the function of cell discarding mentioned previously, and would be responsible for maintaining the congestion status of the transit queues. All of these functions are more complex and can be achieved because of the lower rate of cell processing required by the Reduced-Rate Cell Processor and Dequeuer.

The Cell Processor Controller is used to control the overall functions of the CP, including writing the look up tables associated with the inbound Cell Processor and collecting traffic statistics. The Cell Processor Controller communicates with the Cell Processor Controllers of the other CPs in the node by way of the inbound and outbound cell data paths described above.

Thus, while the prior art has focused on building cell relay switches with either a single or the equivalent of a single FIFO queue at the output of the switch, the present invention teaches a method and device for utilizing transit queues to facilitate cost-efficient, non-complex cell processing of cell transmission from a cell interconnect to a node output.

Although exemplary embodiments are described above, it will be obvious to those skilled in the art that many alterations and modifications may be made without departing from the invention. Accordingly, it is intended that all such alterations and modifications be included within the spirit and scope of the invention as defined in the appended claims.

We claim:

1. A method for a cell processor for utilizing Cell Transit Queues to partition cell processing of cells from a Cell Interconnect in a cell relay network, comprising the steps of:
   1A) utilizing a Cell Interconnect Receive Interface for high rate, non-complex processing of receiving cells from said Cell Interconnect to provide first queues,
   1B) utilizing an Intermediate-Rate Cell Processor and Enqueuer for processing and reading the first queues and placing each of the cells from said first queues into one of said Cell Transit Queues at an intermediate rate,
   1C) using a Reduced-Rate Cell Processor and Dequeuer for reading cells from a front of each Cell Transit Queue at a predetermined reduced cell processing rate,.
   1D) utilizing a Cell Processor Controller that is operably coupled to the Reduced-Rate Cell Processor and Dequeuer for providing predetermined control functions for the CP while at the predetermined reduced cell processing rate,
   1E) utilizing an Inbound Cell Processor for providing predetermined cell input management functions, and
   1F) utilizing a Cell Interconnect Transmit Interface for transmitting cells to the Cell Interconnect.

2. The method of claim 1 wherein high rate, non-complex processing of receiving cells from the Cell Interconnect to provide first queues comprises at least placing each (unfiltered) cell in one of a predetermined number of first-in-first-out (FIFO) queues in the Cell Interconnect Receive Interface in accordance with a predetermined FIFO number in the cell header.

3. The method of claim 2 wherein the predetermined number of FIFO queues is one of: one and two.

4. The method of claim 2 wherein the step of utilizing an Intermediate-Rate Cell Processor and Enqueuer for processing and reading the first queues and placing cells from the first queues into a plurality of transit queues at an intermediate rate includes at least the steps of:
   5A) removing each cell from the FIFO queues and, using a Transit Queue Identifier in the cell header, 5B) stripping the Transit Queue Identifier from each cell and placing the cell into one of the plurality of Transit Queues, 5. The method of claim 4 further including the step of the Intermediate-Rate Cell Processor and Enqueuer discarding cells based on the Cell Loss Priority (CLP) bit in the cell header and the state of at least a first transit queue prior to placing the cells in the Transit Queues.

6. The method of claim 4 further including the step of the Reduced-Rate Cell Processor and Dequeuer maintaining the congestion status of the transit queues and performing the function of cell discarding according to a predetermined scheme.

7. The method of claim 1 wherein the intermediate rate is a rate in a range from an instantaneous rate of cell arrivals from the Cell Interconnect and a maximum aggregate rate at which cells can depart from node output interfaces of one CP and be absorbed by the Cell Processor Controller of the same CP.

8. The method of claim 1 wherein the predetermined reduced cell processing rate is a rate nominally equal to the sum of:
9A) a maximum aggregate rate at which cells can depart from node output interfaces of one Cell Processor (CP), and
9B) a maximum absorption rate of the Cell Processor Controller.

9. The method of claim 1 wherein the step of utilizing an Inbound Cell Processor for providing predetermined cell input management functions includes performing at least one of: translation, traffic monitoring and policing, and statistics collection.

10. The method of claim 1 wherein at least one of:
11A) the Transit Queues are of different sizes, and, where selected, depend on a type of enqueued traffic,
11B) the Transit Queues are of a same predetermined size,
11C) at least a first Transit Queue is dedicated to queueing the traffic from a single cell relay connection, and
11D) cells from more than one connection are enqueued into a single Transit Queue.

11. The method of claim 1 wherein the Reduced-Rate Cell Processor and Dequeuer removes cells from the Cell Transit Queues according to a predetermined queuing discipline, and multiplexes these into one of:
an internal interface, and
at least one external interface.

12. The method of claim 11 wherein the predetermined queueing discipline includes one of:
13A) utilizing a scan table, and
13B) performing a computation.

13. The method of claim 1 wherein the Cell Transit Queues are implemented by means of a random access memory (RAM) unit that is partitioned into a set of cell first-in-first-out (FIFO) queues using a circular buffer arrangement.

14. The method of claim 13 wherein the step of utilizing an Intermediate-Rate Cell Processor and Enqueuer for processing and reading the first queues and placing each of the cells from the first queues into one of a plurality of Cell Transit Queues at an intermediate rate includes:
the Intermediate-Rate Cell Processor and Enqueuer writing cells onto the end of each FIFO at the intermediate rate, and the Reduced-Rate Cell Processor and Dequeuer reading cells from the front of each FIFO at a reduced rate.

15. The method of claim 1 wherein the predetermined control functions of the CP include controlling predetermined overall functions of the CP.

16. The method of claim 15 wherein the predetermined overall functions of the CP include at least one of:
writing look up tables associated with the Inbound Cell Processor,
collecting traffic statistics, and
communicating with Cell Processor Controllers of other CPs in the node by way of the inbound and outbound cell data paths.

17. A cell processor for utilizing Cell Transit Queues to partition cell processing of cells from a Cell Interconnect in a cell relay network, comprising:
18A) a Cell Interconnect Receive Interface, operably coupled to receive cells from said Cell Interconnect, for high rate, non-complex processing of received cells from the Cell Interconnect to provide first queues,
18B) an Intermediate-Rate Cell Processor and Enqueuer, operably coupled to the Cell Interconnect Receive Interface, for processing and reading said first queues and placing each of the cells from the first queues into one of said Cell Transit Queues at an intermediate rate,
18C) the Cell Transit Queues, operably coupled to the Intermediate-Rate Cell Processor and Enqueuer, for temporarily storing cells received from the Intermediate-Rate Cell Processor and Enqueuer,
18D) a Reduced-Rate Cell Processor and Dequeuer, operably coupled to said Cell Transit Queues, for reading cells from a front of each Cell Transit Queue at a predetermined reduced cell processing rate,
18E) a Cell Processor Controller, operably coupled to the Reduced-Rate Cell Processor and Dequeuer, for providing predetermined control functions for the CP while at the predetermined reduced cell processing rate,
18F) an Inbound cell Processor, operably coupled to the Cell Processor Controller, for providing predetermined cell input management functions, and
18G) a Cell Interconnect Transmit Interface, operably coupled to the Inbound Cell Processor, for transmitting cells to the Cell Interconnect.

18. The CP of claim 17 wherein high rate, non-complex processing of receiving cells from the Cell Interconnect to provide first queues comprises at least placing each (unfiltered) cell in one of a predetermined number of first-in-first-out (FIFO) queues in the Cell Interconnect Receive Interface in accordance with a predetermined FIFO number in the cell header.

19. The CP of claim 18 wherein the predetermined number of FIFO queues is one of: one and two.

20. The CP of claim 17 wherein the Intermediate-Rate Cell Processor and Enqueuer is further utilized for:
6A) removing each cell from the FIFO queues and, using a Transit Queue Identifier in the cell header,
6B) stripping the Transit Queue Identifier from each cell and placing the cell into one of the plurality of Transit Queues.

21. The CP of claim 20 wherein the Intermediate-Rate Cell Processor and Enqueuer further discards cells based on the Cell Loss Priority (CLP) bit in the cell header and the state of at least a first transit queue prior to placing the cells in the Transit Queues.

22. The CP of claim 20 wherein the Reduced-Rate Cell Processor and Dequeuer maintains the congestion status of the transit queues and performs the function of cell discarding according to a predetermined scheme.

23. The method of claim 17 wherein the intermediate rate is a rate in a range from an instantaneous rate of cell arrivals from the Cell Interconnect and a maximum aggregate rate at which cells can depart from node output interfaces of one CP and be absorbed by the Cell Processor Controller of the same CP.

24. The CP of claim 17 wherein the predetermined reduced cell processing rate is a rate nominally equal to the sum of:
  26A) a maximum aggregate rate at which cells can depart from node output interfaces of one cell processor (CP), and
  26B) a maximum absorption rate of the Cell Processor Controller.

25. The CP of claim 17 wherein the Inbound Cell Processor further provides predetermined cell input management functions that include performing at least one of: translation, traffic monitoring and policing, and statistics collection.

26. The CP of claim 17 wherein at least one of:
  28A) the Transit Queues are of different sizes, and, where selected, depend on a type of enqueued traffic,
  28B) the Transit Queues are of a same predetermined size,
  28C) at least a first Transit Queue of said Transit Queues is dedicated to queueing the traffic from a single cell relay connection, and
  28D) cells from more than one connection are enqueued into a single Transit Queue.

27. The CP of claim 17 wherein the Reduced-Rate Cell Processor and Dequeuer removes cells from the Cell Transit Queues according to a predetermined queueing discipline, and multiplexes these into one of:
  29A) an internal interface, and
  29B) at least one external interface.

28. The CP of claim 27 wherein the predetermined queueing discipline includes one of:
  30A) utilizing a scan table, and
  30B) performing a computation.

29. The CP of claim 17 wherein the Cell Transit Queues are partitions of a random access memory (RAM) unit into a set of cell first-in-first-out (FIFO) queues using a circular buffer arrangement.

30. The CP of claim 29 wherein the Intermediate-Rate Cell Processor and Enqueuer further writes cells onto the end of each FIFO at the intermediate rate, and the Reduced-Rate Cell Processor and Dequeuer reads cells from the front of each FIFO at a reduced rate.

31. The CP of claim 17 wherein the predetermined control functions of the CP include controlling predetermined overall functions of the CP.

32. The CP of claim 31 wherein the predetermined overall functions of the CP include at least one of:
  34A) writing look up tables associated with the Inbound Cell Processor,
  34B) collecting traffic statistics, and
  34C) communicating with Cell Processor Controllers of other CPs in the node by way of the inbound and outbound cell data paths.

* * * * *